United States Patent [19]

Duncan

[11] 4,034,712
[45] July 12, 1977

[54] PULSATION SYSTEM

[76] Inventor: Lloyd P. Duncan, 3 River Bend Place, Washington, Mo. 63090

[21] Appl. No.: 634,331

[22] Filed: Nov. 24, 1975

[51] Int. Cl.² .......................................... A01J 5/04
[52] U.S. Cl. .......................... 119/14.36; 119/14.38
[58] Field of Search ......... 119/14.38, 14.28, 14.36, 119/14.41, 14.49

[56] References Cited

U.S. PATENT DOCUMENTS

| 737,669 | 9/1903 | Sharples | 119/14.38 |
| 1,386,498 | 8/1921 | Hewlett | 119/14.28 |

Primary Examiner—Hugh R. Chamblee
Attorney, Agent, or Firm—Mason, Mason & Albright

[57] ABSTRACT

Teat cups are pulsed by a valve in a duct leading from the shell into the pulsation space between a resilient inflation and the shell. The valve alternately opens the pulsation space to ambient pressure and to a source of vacuum. The source of vacuum in the receiver or milk lines is in communication with the pulsation space through a tube or passage that is controlled by the valve. A timer connected to a solenoid actuator for the valve unseats the valve to allow air to enter the pulsation space, whereupon the inflation assumes a normal configuration. Upon seating to close ambient air entry while establishing vacuum to the space, the vacuum flattens the inflation. The timer sequences the air movement to ensure that milk flowing to the receiver clears the milk from the inflation and prevents back flow to the animal's teats.

8 Claims, 5 Drawing Figures

PULSATION SYSTEM

This application is related to Ser. No. 487,781 filed July 11, 1974, now U.S. Pat. No. 3,931,795, which discloses teat cups that are pulsed without conventional pulsators. In the prior application, various spring means—pneumatic combinations are disclosed that periodically vent the pulsation space between the shell and inflation.

The pulsation space is normally under partial pressure or vacuum and that vacuum is preferably substantially constant. Also, the vacuum maintained in the teat cups and periodically in the pulsation space is relatively lower than that maintained in the milk collector lines and bulk collection tank. The system of maintaining a higher vacuum (about 17" Hg or higher) in the collector lines and bulk tank while having a lower vacuum (about 10–13" Hg), in the pulsation lines including the teat cups, is described in U.S. Pat. No. 3,373,720.

Milking systems currently in use are inefficient in that the pulsator systems are required to move substantial amounts of air during each pulsation cycle. Reducing the amount of vacuum from about 17 to 10" Hg in the pulsator lines increases efficiency and is less likely to injure the animal being milked, but still, the pulsator lines are sometimes long and substantial amounts of air must be moved through these lines during each pulse. Thus, pulsation is somewhat sluggish and wasteful in these systems.

In most pulsation systems, each inflation is pulsed or cycled 50-60 times each minute and the pulsator must be large enough to evacuate substantially all of the air in the pulsation lines and connections the same number of times. Since the conventional pulsator and its lines are some distance removed from the claws, the currently used systems are quite inefficient. Also, there are more opportunities for leaks in the lengthy conventional pulsator systems which lead to vacuum variations, particularly during the exchanging of a claw from one animal to another.

However, the primary object of the present invention is to remove the last restriction, namely the milk, between the cow's teat and the receiver. This is accomplished by removing the milk collected in the inflation tube after each pulsation or removing it during the milk letdown cycle. This removal prevents the buildup of milk in the inflation tube and any back flush af air and/or milk that exposes the end of the teat to infection.

It is thought that 98% of the infection causing mastitis enters the cow through the streak canal and that the milking machine plays a major role in the transfer of infection. The sphincter muscle, that protects the end of the teat opening, is so dilated during the milking process that it cannot prevent re-entrance. Therefore, it is necessary to protect the end of the teat by preventing flooding of the teat by milk backed up from the neck of the inflation tube and/or the spray of milk and air caused by suction that creates the pressure drop and equalizes after each pulsation cycle.

It is possible to connect the pulsation tube at a point and so locate it that the displaced air will act as, or create a venturi action to clear any remaining milk and prevent the back flush of air in direction of the teat.

It is an object of the pulsator systems to reduce the amount of air that is currently moved through the lines during pulsation cycles. It is another object of the present invention to interconnect the pulsation space with a constant cource of vacuum which exists in the teat cup interior and the receiver.

The above and other objects will be apparent from the disclosure herein, including the drawings wherein.

Figure 1:
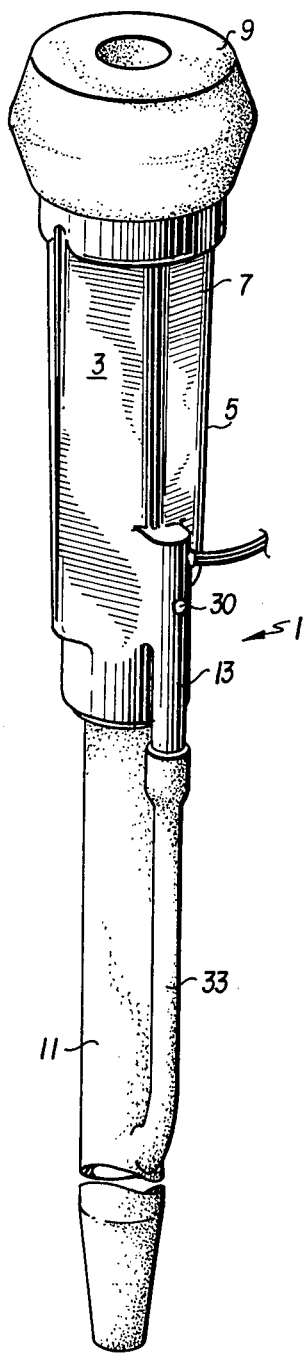
FIG. 1 is a perspective view of an assembled teat cup according to the present invention.
Figure 2:
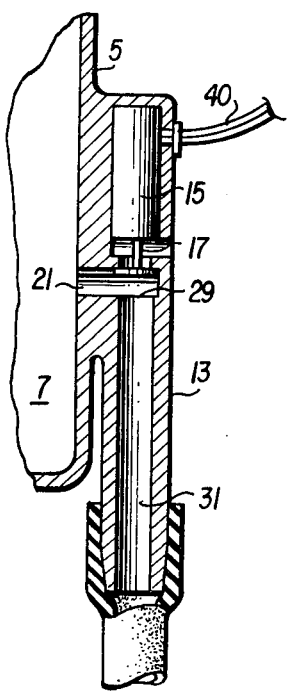
FIG. 2 is a section of a part of the FIG. 1 teat cup shell.
Figure 3:
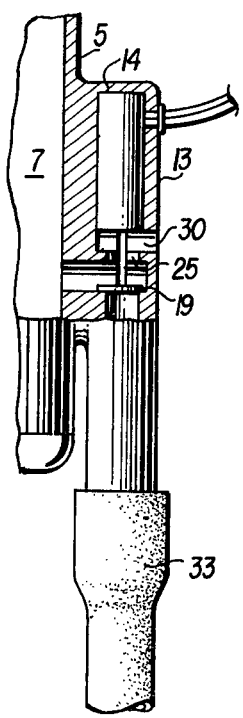
FIG. 3 is a partial section of the same teat cup shell showing an operating valve.

In FIG. 1, the teat cup 1 has an inner resilient inflation 3 within shell 5 leaving a pulsation space 7 between them. The inflation can be identical to that disclosed in FIG. 1 of copending Ser. No. 487,781 and has an upper folded over flap 9 and a lower part 11 that extends below shell 5. The flap 9 and part 11 hermetically seal the open ends of shell and pulsation space 7. The shell 5 can be of transparent plastic.

At one side of the wall of shell 5, preferably near the lower end thereof, an appendage 13 has an internal upper chamber 14 that houses a valve member 15. The valve member 15 is preferably a conventional solenoid coil with a plunger 17 and valve head 19 that are movable upwardly and downwardly within a duct in the shell 5. The duct preferably extends in a horizontal direction and has an upper seat 25 and a lower seat 29 for valve head 19.

Figure 4:
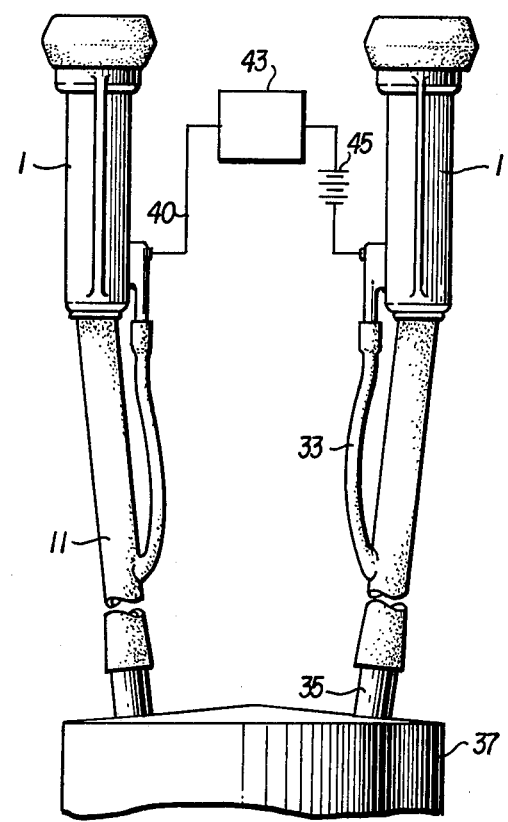
FIG. 4 is an elevation of a milking claw having the teat cups of the present invention.

The upper seat 25 leads to an entrance 30 to ambient air pressure while the lower seat 29 leads to a passage 31 in the lower portion of appendage 13 and the latter is tapered to fit within a flexible tube 33 which affords a conduit to a source of vacuum. Tube 33 is releasably connectable to appendage 13, and can be molded as an integral part of inflation part 11 as shown. The part 11 can be fitted on a nipple 35 (FIG. 4), at the top of a milk receiver 37 in which a constant vacuum is maintained.

It will be apparent that if a constant vacuum of about 10" high is maintained in receiver 37 and teat cups 1 are fitted on nipples 35, a constant vacuum of the same magnitude exists within inflations 3 on the animal's teats and in passage 31 through tubes 33. When valve head 19 is seated on seat 25, and raised off the lower seat 29, communication to that source of vacuum is established to space 7 through duct 21. However, when valve head 19 closes seat 29 and separates from seat 25 exposing entrance 30, the space 7 is quickly vented to ambient pressure via duct 21.

The valve member 15 can be a solenoid plunger type with electrical leads 40 to a timer 43 and a power source, either an electrical power-line or battery 45. Thus, for each pulsation cycle, the valve member 15 is signalled through timer 43, and valve head 19 is urged downwardly to close seat 19, allowing ambient pressure to become established with space 7. The inflation 3 is then allowed to expand to its normal substantially round shape. When current is interrupted to valve member 15, the valve head 19 is biased to close seat 25 and a vacuum is quickly established within space 7. The valve head 19 can be biased by an internal compression spring (not shown), or the solenoid can be structured to positively withdraw the head 19 to close seat 25 when the solenoid is activated.

Since one of the objectives of the present invention is to reduce the amount of air moved through the system, and reduce the amount of power used during each cycle, the shell 5 can be designed to have a relatively small space 7. At the same time, exterior surface of inflation 3 and the interior surface of shell 5 can be cleaned and flap 9 unfolded to allow complete drainage when the cup 1 is suspended upside down. Also, the tube 33, entrance 31 and other internal parts of the system can be washed in accordance with U.S. Pat. No. 3,726,253 so that all direct and indirect milk contact surfaces can be cleaned by circulation wash and sanitizing solution.

Thus, it is preferred, but not essential that shell 5 be elliptical in cross section, at least internally, so that the inflation partially flattens to conform to shell 5 when vacuum is applied to space 7. This structure is clearly shown in, inter alia, FIGS. 4, 5, 9, and 10 of Ser. No. 487,781. Also the teat cup can have an upper insert as disclosed in FIGS. 20-22 of that application.

Alternatively, the inflation 3 itself can be molded to have thickened opposite sides so that it can partially flatten more readily when vacuum is applied to space 7.

Figure 5:
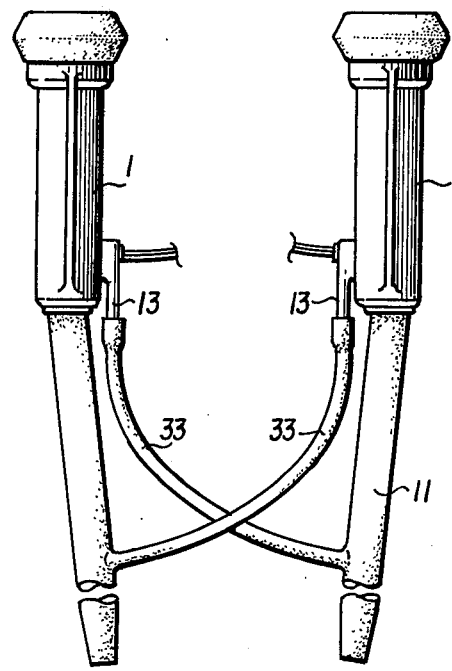
FIG. 5 is an elevation of a milking claw similar to that of FIG. 4, but with an alternative pulsation arrangement.

In FIG. 5, the tube 33 of one inflation 1 is exchanged with a tube 33 of another inflation of the same claw.

The timer 43 is preferably set to allow the milk to clear the lower part 11 of inflation 3, below the connection of tube 33 to that part. Thus, valve head 19 is timed to unseat from seat 29 after the milk has passed from the inflation part 11 and precisely control the milk-rest ratio with a minimum air movement needed to clear the milk from part 11.

In FIG. 5, the tube 11 of the inflation in the teat cup 1 on the left is connected to the entrance 13 of the teat cup on the right and vice versa. With the FIG. 5 arrangement, the timer 43 cycles the respective valves 15 of each pair of teat cups so that milk in one inflation is being evacuated during the milking cycle of the other inflation 3. This alternating time cycle for each of the two pairs of teat cups of each claw controls the milk-rest ratio best and the air being moved from the space 7 of the one teat cup can assist the milk evacuation from the other teat cup during the latter's rest period. The arrangement of FIG. 5 also has more structural integrity than that of FIG. 4.

An added advantage of the invention disclosed herein is that a replaceable air filter can be easily incorporated in the pulsation lines because only a relatively small amount of air is moved during each pulsation cycle. Hence, a single service disposable filter, such as that used on cigarettes with disinfectants can be employed to remove mold spores and/or bacteria. The air in the pulsation lines should be filtered, especially during winter when the animals are housed.

I claim:

1. A teat cup comprising an outer substantially rigid shell of hollow construction and an inner resilient inflation, said inflation extending through the shell and being housed within said shell in spaced apart relationship to leave a pulsation space, said inflation being hermetically sealable at each end with respect to the shell, a source of vacuum being connectable to the interior of said inflation, duct means in said shell opening into said space and means defining a first entrance communicating ambient air from the outside of the shell to said duct means, said inflation having a lower part that is connectable to said source of vacuum within a milk receiver and passage means communicating said vacuum to said duct means through means providing a second entrance, valve means in said duct means being movable to selectively block either said entrance, an electrical timer means connected to said valve means and said valve means being movable to place the duct means and space alternately in communication with ambient air and said source of vacuum, whereby said inflation is pulsed.

2. The teat cup of claim 1, wherein said shell has an appendage that accommodates said duct means and valve, said passage means commencing in a lower portion of said appendage.

3. The teat cup of claim 1, wherein said duct means extends substantially horizontal and said valve means is a solenoid valve with head that is movable in the duct means in substantially vertical directions.

4. The teat cup of claim 3, wherein said first and second entrances are located in the upper and lower wall, respectively, of said duct means.

5. A milking claw comprising two pairs of teat cups and each teat cup including an outer rigid shell and an inner resilient inflation, said inflation being housed in the shell in spaced apart relationship leaving a pulsation space that is hermetically sealed at each end of the shell, duct means in said shell in open communication with the pulsation space and movable valve means in said duct means being associated with said duct means, means defining a first entrance in said duct means for a source of substantially constant vacuum, a second entrance in communication with a source of ambient air, said valve means being positioned to selectively open either said entrance and timer means being connected to the valve means to move same and place said duct means and space in communication with either the source of air or the vacuum source, said inflation having a lower part that is connectable to said source of vacuum within a milk receiver and passage means communicating that vacuum to the duct means through said first entrance, whereby said inflation is pulsed.

6. The claw of claim 5, wherein a tube leads from the lower inflation part to said second entrance, said tube constituting a passage for the vacuum source.

7. The claw of claim 6, wherein said claw comprises two pairs of teat cups and the tube of a first teat cup inflation of each pair is connected to the second entrance of the second teat cup of the pair, said timer means being connected to the valve means of each cup.

8. The claw of claim 7, wherein the valve means of the first teat cup is moved by the timer to open the second entrance of that teat cup and close the second entrance of the second teat cup.

* * * * *